US008803855B2

(12) United States Patent
Goh et al.

(10) Patent No.: US 8,803,855 B2
(45) Date of Patent: Aug. 12, 2014

(54) LIQUID CRYSTAL DISPLAY, METHOD OF DRIVING THE SAME, AND METHOD OF MANUFACTURING THE SAME

(75) Inventors: Joon-Chul Goh, Hwaseong-si (KR); Young-Soo Yoon, Anyang-si (KR); Soo-Wan Yoon, Hwaseong-si (KR); Chongchul Chai, Seoul (KR)

(73) Assignee: Samsung Display Co., Ltd. (KR)

( * ) Notice: Subject to any disclaimer, the term of this patent is extended or adjusted under 35 U.S.C. 154(b) by 772 days.

(21) Appl. No.: 12/880,331

(22) Filed: Sep. 13, 2010

(65) Prior Publication Data

US 2011/0261028 A1 Oct. 27, 2011

(30) Foreign Application Priority Data

Apr. 22, 2010 (KR) ........................ 10-2010-0037536

(51) Int. Cl.
*G06F 3/038* (2013.01)
*G09G 3/36* (2006.01)
*G02F 1/136* (2006.01)

(52) U.S. Cl.
USPC ................. 345/204; 345/87; 345/90; 345/92; 349/42; 349/48

(58) Field of Classification Search
None
See application file for complete search history.

(56) References Cited

U.S. PATENT DOCUMENTS

| | | | | |
|---|---|---|---|---|
| 6,084,579 | A * | 7/2000 | Hirano | 345/205 |
| 6,222,236 | B1 * | 4/2001 | Lamey | 257/355 |
| 7,079,101 | B1 * | 7/2006 | Asada | 345/92 |
| 7,576,720 | B2 * | 8/2009 | Lin et al. | 345/87 |
| 8,411,007 | B2 * | 4/2013 | Chen et al. | 345/92 |
| 2006/0103800 | A1 * | 5/2006 | Li et al. | 349/129 |
| 2006/0286703 | A1 * | 12/2006 | Um et al. | 438/30 |
| 2008/0284929 | A1 * | 11/2008 | Kimura | 349/38 |
| 2009/0015328 | A1 * | 1/2009 | Aoki et al. | 330/252 |
| 2009/0027578 | A1 | 1/2009 | You et al. | |
| 2009/0040413 | A1 * | 2/2009 | Chen et al. | 349/48 |
| 2009/0268112 | A1 | 10/2009 | Lu et al. | |
| 2013/0077002 | A1 * | 3/2013 | Yoon et al. | 349/38 |

FOREIGN PATENT DOCUMENTS

| | | |
|---|---|---|
| JP | 2007058177 | 3/2007 |
| KR | 1020010001328 | 1/2001 |
| KR | 1020090011586 | 2/2009 |
| KR | 1020090054300 | 5/2009 |

* cited by examiner

*Primary Examiner* — Srilakshmi K Kumar
*Assistant Examiner* — Stephen T Reed
(74) *Attorney, Agent, or Firm* — Cantor Colburn LLP

(57) ABSTRACT

A liquid crystal display includes a plurality of pixels. Each pixel of the plurality of pixels includes a gate line which receives a gate signal; a data line which receives a data voltage; a first sub-pixel including a first transistor connected to the gate line and the data line, wherein the first transistor outputs the data voltage in response to the gate signal; and a first liquid crystal capacitor connected to the first transistor. Each pixel further includes a second sub-pixel including a second transistor connected to the gate line and the data line, wherein the second transistor outputs the data voltage in response to the gate signal; and a second liquid crystal capacitor connected to the second transistor; a resistor connected to the second transistor; and a first sharing capacitor connected to the resistor, wherein the first sharing capacitor receives the data voltage through the resistor.

21 Claims, 17 Drawing Sheets

LIQUID CRYSTAL DISPLAY, METHOD OF DRIVING THE SAME, AND METHOD OF MANUFACTURING THE SAME

This application claims priority to Korean Patent Application No. 2010-37536, filed on Apr. 22, 2010, and all the benefits accruing therefrom under 35 U.S.C. §119, the content of which in its entirety is herein incorporated by reference.

BACKGROUND OF THE INVENTION

1. Field of the Invention

The present invention generally relates to a liquid crystal display with substantially improved light transmittance and lateral visibility, a method of driving the liquid crystal display, and a method of manufacturing the liquid crystal display.

2. Description of the Related Art

To overcome a narrow viewing angle of a liquid crystal display ("LCD"), various modes for the LCD, such as a patterned vertical alignment ("PVA") mode in which liquid crystal molecules are aligned in a vertical direction, a multi-domain vertical alignment ("MVA") mode in which the liquid crystal molecules are aligned in various directions in a pixel, and a super-patterned vertical alignment ("S-PVA") mode, and various other modes have been developed.

In the S-PVA mode LCD, one pixel typically includes two sub-pixels to which different sub-voltages are applied, respectively. Since human eyes looking at the LCD only recognize an intermediate value between the two sub-voltages each applied to the sub-pixels of the one pixel, respectively, a lateral visibility is substantially improved.

BRIEF SUMMARY OF THE INVENTION

Exemplary embodiments of the present invention provide a liquid crystal display (LCD) with an improved lateral visibility.

Exemplary embodiments of the present invention provide a method of driving the LCD.

Exemplary embodiments of the present invention provide a method of manufacturing the LCD.

Exemplary embodiment of an LCD includes a plurality of pixels, and each pixel of the plurality of pixels includes a gate line, a data line, a first sub-pixel, a second sub-pixel, a resistor, and a first sharing capacitor. In one exemplary embodiment, the LCD further includes a second sharing capacitor.

The first sub-pixel includes a first transistor connected to the gate line and the data line to output the data voltage in response to the gate signal and a first liquid crystal capacitor connected to the first transistor to receive the data voltage output from the first transistor. The second sub-pixel includes a second transistor to receive the data voltage output from the first transistor. The second sub-pixel includes a second transistor connected to the gate line and the data line to output the data voltage in response to the gate signal and a second liquid crystal capacitor connected to the second transistor to receive the data voltage output from the second transistor.

The resistor is connected in parallel with the second liquid crystal capacitor and receives the data voltage output from the second transistor. The first sharing capacitor is connected to the resistor to receive the data voltage through the resistor. In one exemplary embodiment, the second sharing capacitor is connected between the first sharing capacitor and the first liquid crystal capacitor and increases a voltage level of the first pixel voltage by a voltage coupling.

Exemplary embodiment of an LCD includes an array substrate including a first base substrate and a plurality of pixels disposed on the first base substrate, an opposite substrate including a second base substrate opposite to the first base substrate and a common electrode disposed on the second base substrate, and a liquid crystal layer disposed between the array substrate and the opposite substrate.

The array substrate includes a gate line receiving a gate signal, a data line receiving a data voltage, and a first transistor and a second transistor each connected to the gate line and the data line to output the data voltage in response to the gate signal. In addition, the array substrate includes a first pixel electrode connected to the first transistor to receive the data voltage output from the first transistor, a second pixel electrode connected to the second transistor to receive the data voltage output from the second transistor and spaced apart from the first pixel electrode, a resistor connected to the second transistor to receive the data voltage output from the second transistor, a first coupling electrode connected to the resistor to receive the data voltage through the resistor, and a first cap electrode opposite to the first coupling electrode.

Exemplary embodiment of a method of driving an LCD is provided as follows. The data voltage provided through the data line is output through the first and second transistors during a period of a high gate signal provided through the gate line. When the data voltage is received, the first liquid crystal capacitor is charged with a first pixel voltage and the second liquid crystal capacitor is charged with a second pixel voltage having a same voltage level as the first pixel voltage.

After the period of the high gate signal, an electric charge is shared by a first sharing capacitor and the second liquid crystal capacitor, which are connected to the resistor to allow the second pixel voltage charged in the second liquid crystal capacitor to be lower than the first pixel voltage by the electron sharing.

Additionally, after the period of the high gate signal, the first pixel voltage charged in the first liquid crystal capacitor increases by a second sharing capacitor connected between the first sharing capacitor and the first liquid crystal capacitor.

Exemplary embodiments of a method of manufacturing an LCD is provided as follows. An array substrate, an opposite substrate, and a liquid crystal layer are formed.

Particularly, the array substrate including a first base substrate on which a plurality of pixel areas is disposed is formed. First, a first transistor, a second transistor, and a first cap electrode are formed in each pixel area of the plurality of pixel areas, and a resistor connected to the second transistor is formed. Then, a first coupling electrode connected to the second transistor through the resistor and opposite to the first cap electrode is formed. In addition, a first pixel electrode connected to the first transistor and a second pixel electrode connected to the second transistor are formed.

A common electrode is formed on a second base substrate to form the opposite substrate. Then, a liquid crystal layer is formed between the array substrate and the opposite substrate.

According to above, a difference in voltages applied to the two sub-pixels is generated by using the resistor and the capacitor in each pixel of the plurality of pixels without using an additional switching device. Thus, a parasitic capacitance may be reduced and an aperture ratio may be substantially improved when compared to using the additional switching device. Also, the resistor includes amorphous silicon on the same layer as the active layer, therefore, additional processes are not necessary.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
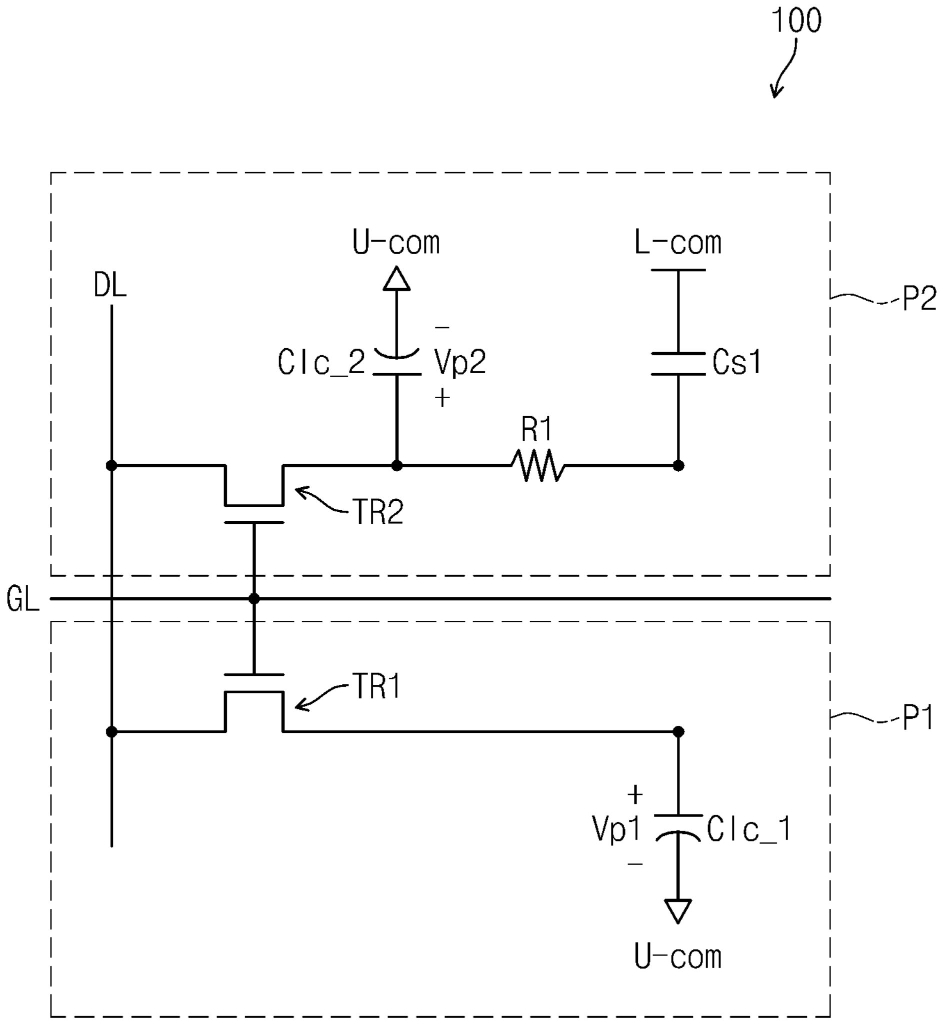
FIG. 1 is an equivalent circuit diagram showing an exemplary embodiment of a pixel included in a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. More over, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope thereof unless otherwise claimed. No language in the specification should be construed as indicating any non-claimed element as essential to the practice of the embodiments as used herein.

Hereinafter, the present invention will be explained in detail with reference to the accompanying drawings.

FIG. 1 is an equivalent circuit diagram showing an exemplary embodiment of a liquid crystal display ("LCD") according to the present invention.

In FIG. 1, an equivalent circuit diagram showing an exemplary embodiment of one pixel among a plurality of pixels disposed on an LCD in a matrix configuration has been illustrated. Since the plurality of pixels may have a substantially similar structure and function as each other, for the convenience of explanation, one pixel will be described in detail and detailed descriptions of other pixels may be omitted.

Referring to FIG. 1, an exemplary embodiment of a pixel 100 includes a gate line GL, a data line DL, a first sub-pixel P1, a second sub-pixel P2, a resistor R1, and a first sharing capacitor Cs1. The first sub-pixel P1 includes a first transistor TR1 and a first liquid crystal capacitor Clc_1, and the second sub-pixel P2 includes a second transistor TR2 and a second liquid crystal capacitor Clc_2. In one exemplary embodiment, the transistors may be thin-film transistors ("TFTs").

Each of the first transistor TR1 and the second transistor TR2 is connected to the gate line GL and the data line DL to output a data voltage in response to a gate signal. The first liquid crystal capacitor Clc_1 is connected to the first transistor TR1 to receive the data voltage output from the first transistor TR1 and is charged with a first pixel voltage Vp1.

The second liquid crystal capacitor Clc_2 is connected to the second transistor TR2 to receive the data voltage output from the second transistor TR2 and is charged with a second pixel voltage Vp2.

The resistor R1 receives the data voltage output from the second transistor TR2. The first sharing capacitor Cs1 is connected to the resistor R1 and receives the data voltage through the resistor R1.

Figure 2A:
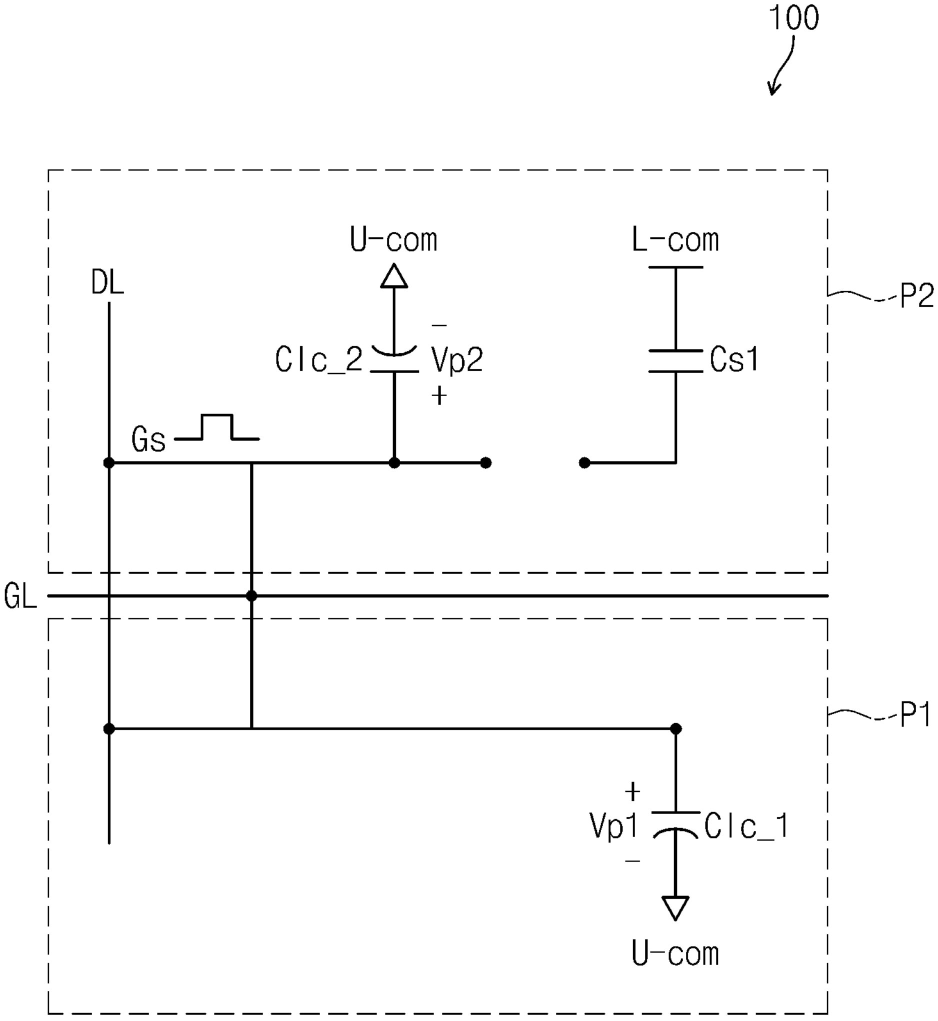
FIGS. 2A and 2B are circuit diagrams showing an operation of a circuit of FIG. 1 in response to a gate signal.
Figure 2B:
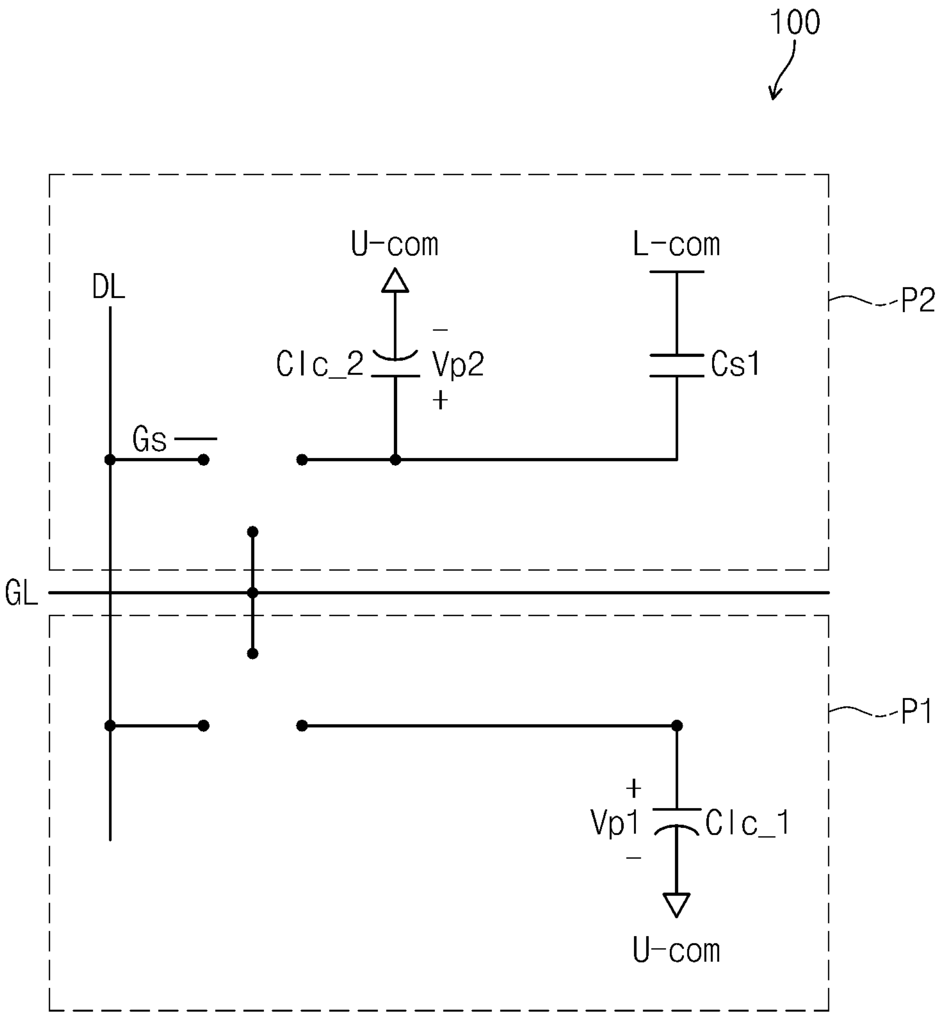
Figure 2C:
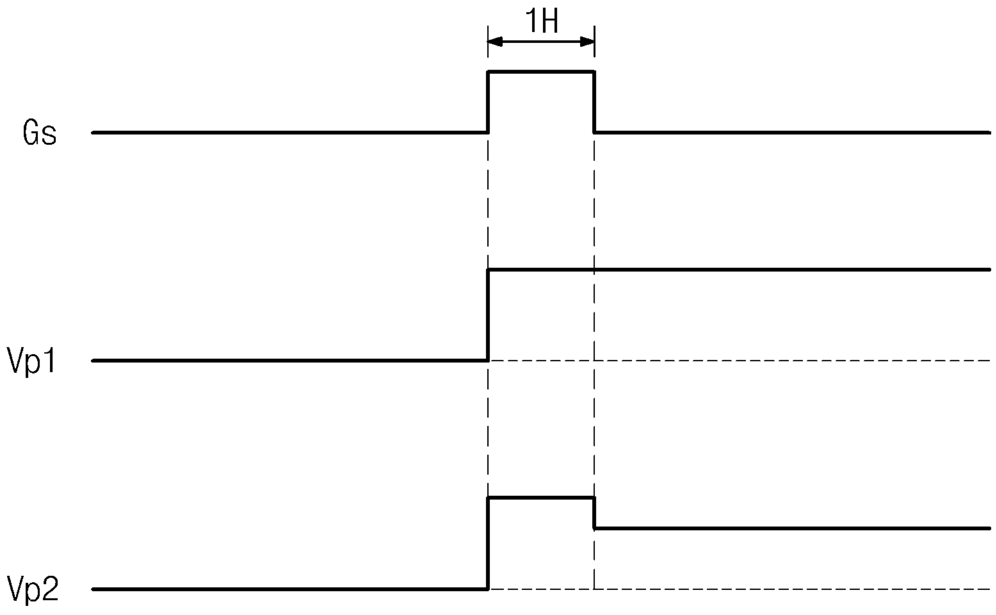
FIG. 2C is a timing diagram showing a change of first and second pixel voltages according to the gate signal.

FIGS. 2A and 2B are circuit diagrams showing an operation of the circuit of FIG. 1 in response to the gate signal, and FIG. 2C is a timing diagram showing a change of the first and second pixel voltages Vp1 and Vp2 according to the gate signal.

Referring to FIGS. 2A and 2C, the first liquid crystal capacitor Clc_1 and the second liquid crystal capacitor Clc_2 receive the data voltage to charge the first pixel voltage Vp1 and the second pixel voltage Vp2, respectively, during a high period 1H of the a gate signal Gs. Since the first sharing capacitor Cs1 does not receive the data voltage during the period 1H, the second pixel voltage Vp2 has a same voltage level as the first pixel voltage Vp1.

Referring to FIGS. 2B and 2C, the first sharing capacitor Cs1 is connected to the second liquid crystal capacitor Clc_2 after the period 1H. Since no voltage is applied to the first sharing capacitor Cs1 and the second liquid crystal capacitor Clc_2 from other sources, the first sharing capacitor Cs1 and the second liquid crystal capacitor Clc_2 share an electric charge. Thus, the second pixel voltage Vp2 has a voltage level that is lower than the first pixel voltage Vp1 after the high period 1H of the gate signal Gs. As described above, the first sub-pixel P1 and the second sub-pixel P2 are charged with different voltages and a user recognizes an intermediate value of the first pixel voltage Vp1 and the second pixel voltage Vp2, thereby a lateral viewing angle of an LCD is substantially improved.

The first sharing capacitor Cs1 is connected to the second liquid crystal capacitor Clc_2 after the period 1H by the resistor R1. This is possible to impart the beneficial characteristics of a circuit which is composed of a resistor and a capacitor. More particularly, in a circuit composed of a resistor and a capacitor, a response time period for changing an output voltage or a current in response to an input voltage or a current may be adjusted according to the characteristics of the resistor and the capacitor. The response time period is referred to as a time constant, and a time constant of the second sub-pixel P2 is as follows.

$$\text{Rcdelay}=R\times(ClcB+Cs)$$ <Equation 1>

In Equation 1, RCdelay represents the time constant of the second sub-pixel P2, ClcB represents a charge capacitance of the second liquid crystal capacitor Clc_2, Cs represents a charge capacitance of the first sharing capacitor Cs1, and R represents a resistance value of the resistor R1.

In case that the time constant is longer than the high period 1H of the gate signal Gs, the data voltage is not applied to the first sharing capacitor Cs1 during the high period 1H, and thus the first sharing capacitor Cs1 is not charged. However, when the time constant is longer than a time period required to display one frame image, the first and second transistors TR1 and TR2 are turned on before the first sharing capacitor Cs1 and the second liquid crystal capacitor Clc2 share the electric charge. Therefore, the second liquid crystal capacitor Clc_2 does not share the electric charge with the first sharing capacitor Cs1. Consequently, the resistance value of the resistor R1 may satisfy Equation 2 as follows.

$$1H/(ClcB+Cs)<R<1F/(ClcB+Cs)$$ <Equation 2>

In Equation 2, 1H represents the period 1H of the high gate signal of Gs, and 1F represents the time period required to display one frame image. In one exemplary embodiment, with reference to a 40-inch LCD TV (as measured across the diagonal thereof), the resistor R1 has a resistance value within a range of $14\ M\Omega(14e6)<R<16\ G\Omega(16e9)$.

Figure 3:
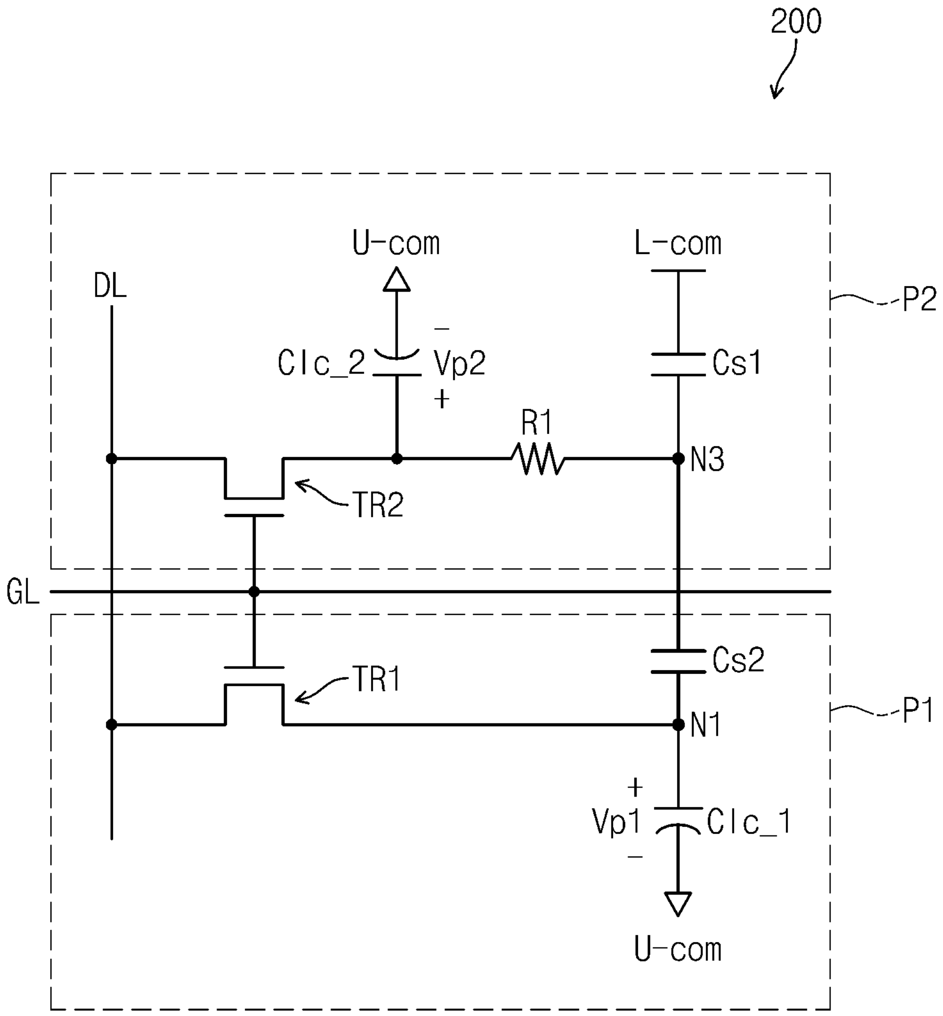
FIG. 3 is an equivalent circuit diagram showing another exemplary embodiment of a pixel of an LCD according to the present invention.

FIG. 3 is an equivalent circuit diagram showing another exemplary embodiment of a pixel of an LCD according to the present invention. In FIG. 3, an exemplary embodiment of a pixel 200 has substantially the same structure and function as the pixel 100 of FIG. 1 except that the pixel 200 further includes a second sharing capacitor Cs2. Thus, detailed descriptions of elements of the pixel 200 which are similar to those previously described may be omitted.

Referring to FIG. 3, the second sharing capacitor Cs2 is connected between a first sharing capacitor Cs1 and a first liquid crystal capacitor Clc_1. In other words, the second sharing capacitor Cs2 is connected to a first node N1 and a third node N3. The second sharing capacitor Cs2 increases a first pixel voltage Vp1 charged in the first liquid crystal capacitor Clc_1 by a voltage coupling after a high period 1H of a gate signal Gs.

Figure 4A:
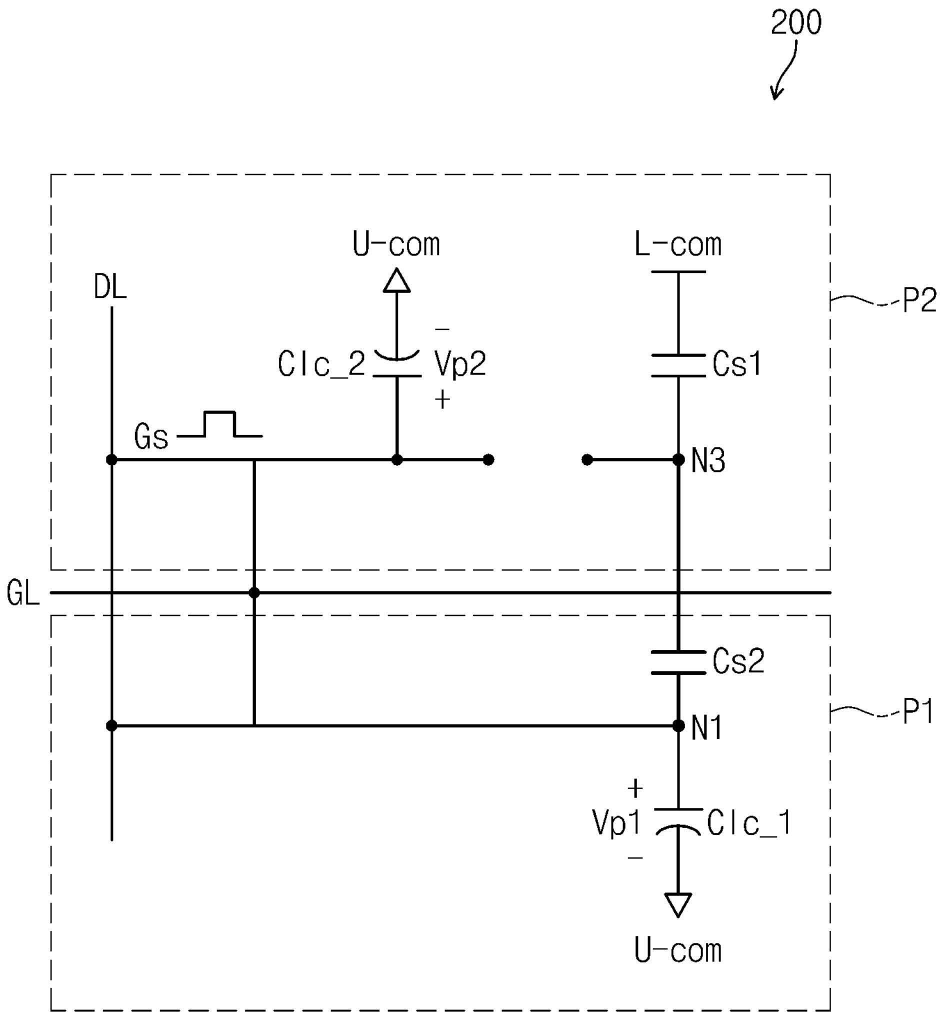
FIGS. 4A and 4B show circuit diagram showing an operation of the exemplary embodiment of a circuit of FIG. 3 in response to a gate signal.
Figure 4B:
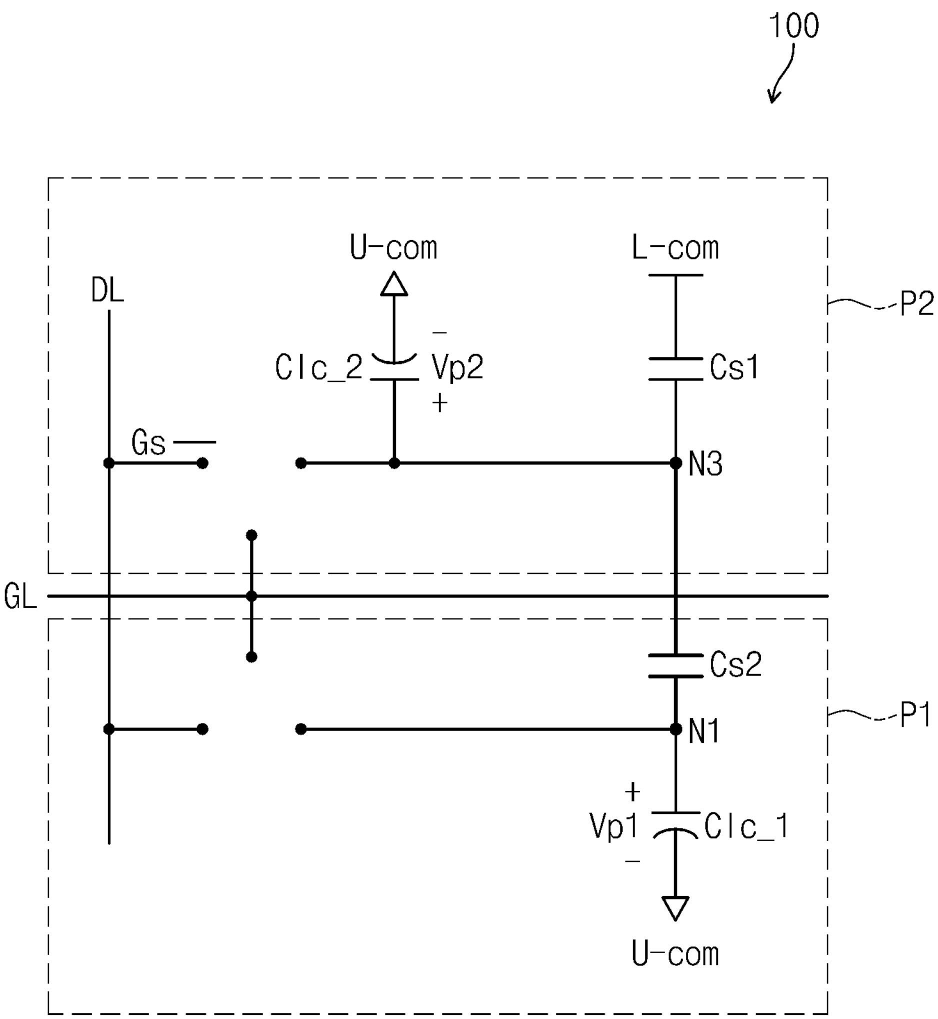
Figure 4C:
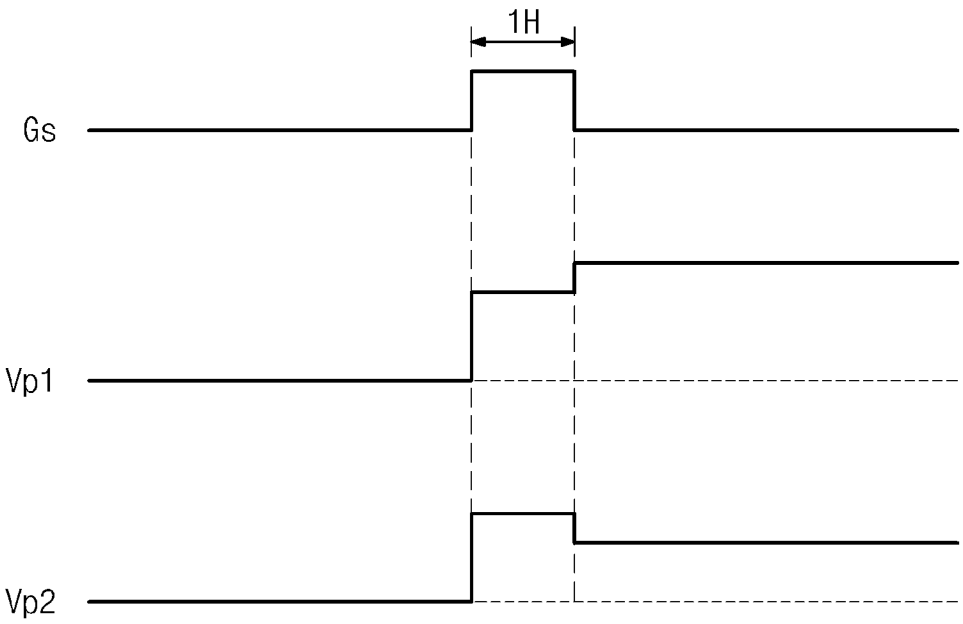
FIG. 4C is a timing diagram showing a change of first and second pixel voltages according to the gate signal.

FIGS. 4A and 4B are circuit diagram showing an operation of the circuit of FIG. 3 in response to a gate signal, and FIG. 4C is a timing diagram showing a change of the first and second pixel voltages according to the gate signal.

Referring to FIGS. 4A and 4C, the first sharing capacitor Cs1 and the second sharing capacitor Cs2 are connected to each other in series with reference to the first node N1 during the high period of the gate signal Gs, and the first and second sharing capacitors Cs1 and Cs2 connected to each other in series are connected with the first liquid crystal capacitor Clc_1 in parallel.

The first liquid crystal capacitor Clc_1 receives the data voltage during the period 1H to charge the first pixel voltage Vp1. Similarly, the first sharing capacitor Cs1 and the second sharing capacitor Cs2 are charged with a portion of the first pixel voltage Vp1 in inverse proportion to the charge capacitance thereof, respectively. Also, the second liquid crystal capacitor Clc_2 receives the data voltage to charge a second pixel voltage Vp2 having substantially the same voltage level as the first pixel voltage Vp1 during the period 1H.

Referring to FIGS. 4B and 4C, the second liquid crystal capacitor Clc_2 and the first sharing capacitor Cs1 are connected to each other in parallel with reference to the third node N3 after the period 1H.

Since no voltage is applied to the first sharing capacitor Cs1 and the second liquid crystal capacitor Clc_2 from other sources after the period 1H, the second liquid crystal capacitor Clc_2 and the first sharing capacitor Cs1 share an electric charge to decrease the second pixel voltage Vp2. Thus, the voltage level of the voltage charged in the first sharing capacitor Cs1 increases according to the decrease of the second pixel voltage Vp2. Also, the second sharing capacitor Cs2 is charged with a substantially similar voltage level as that of the first sharing capacitor Cs1 due to a voltage coupling, thereby increasing the first pixel voltage Vp1. Consequently, the exemplary embodiment of the pixel 200 shown in FIG. 3 may have substantially improved light transmittance compared to the light transmittance of the exemplary embodiment of the pixel 100 shown in FIG. 1.

Figure 5:
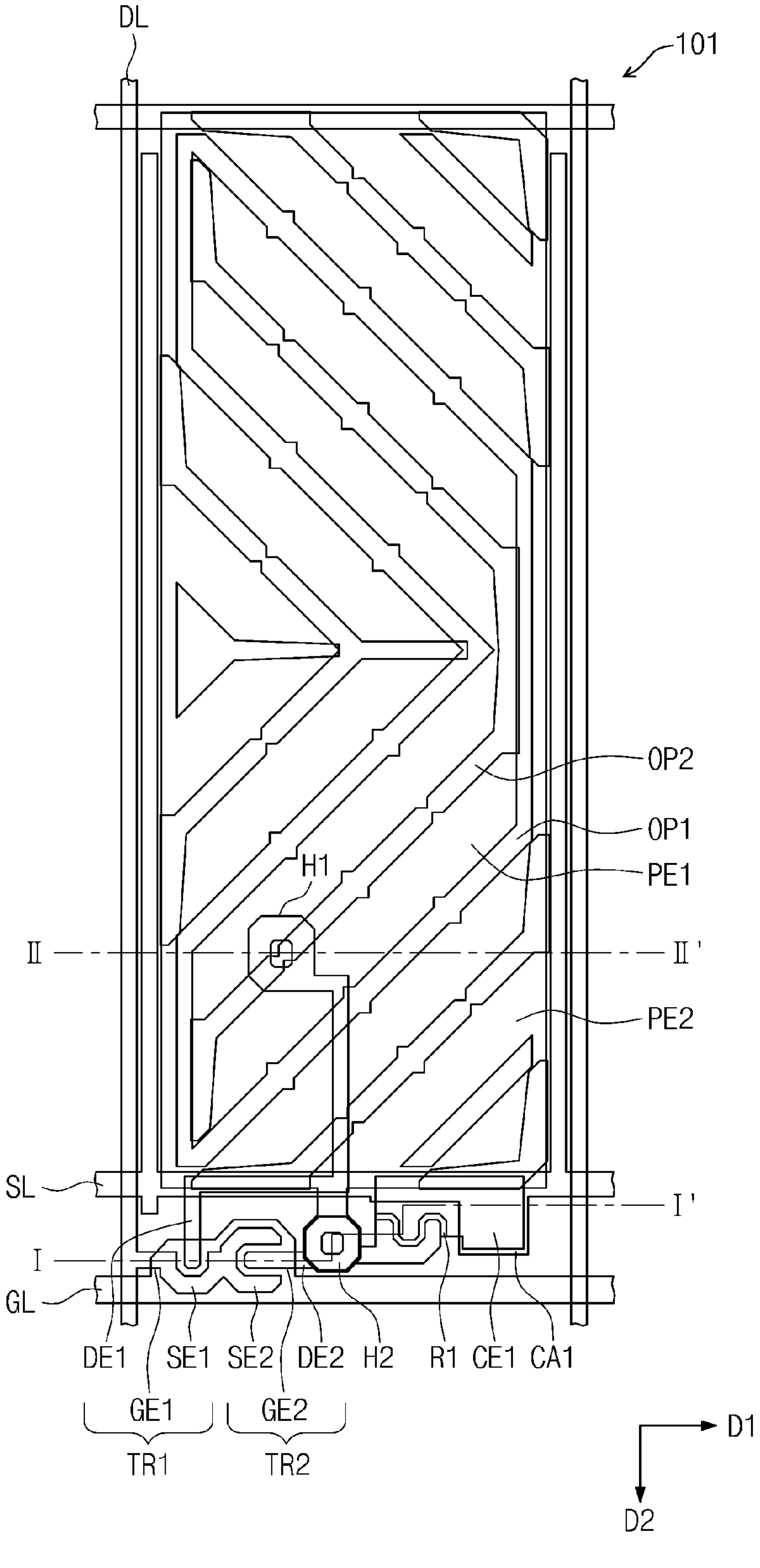
FIG. 5 is a top plan view showing the exemplary embodiment of a pixel of FIG. 1.
Figure 6A:
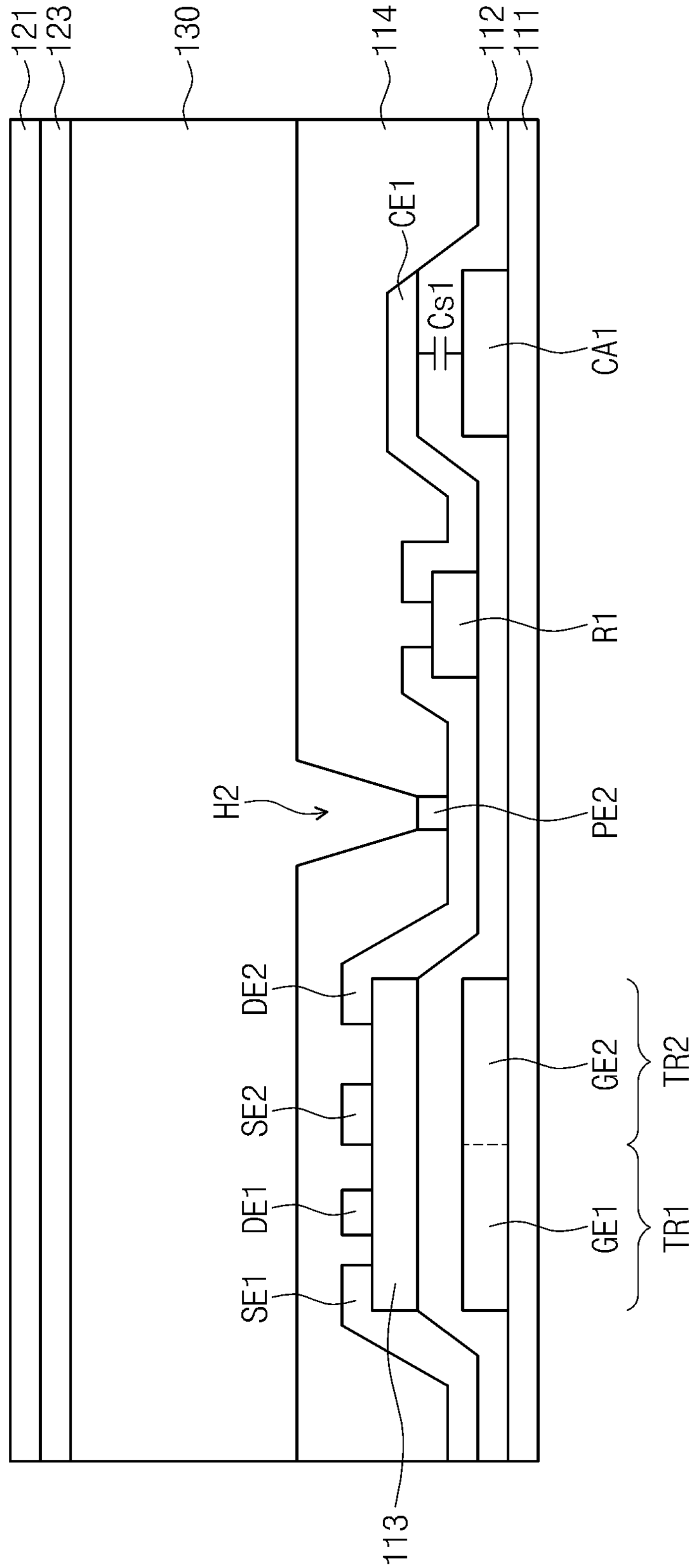
FIG. 6A is a cross-sectional view taken along line I-I' of FIG. 5.
Figure 6B:
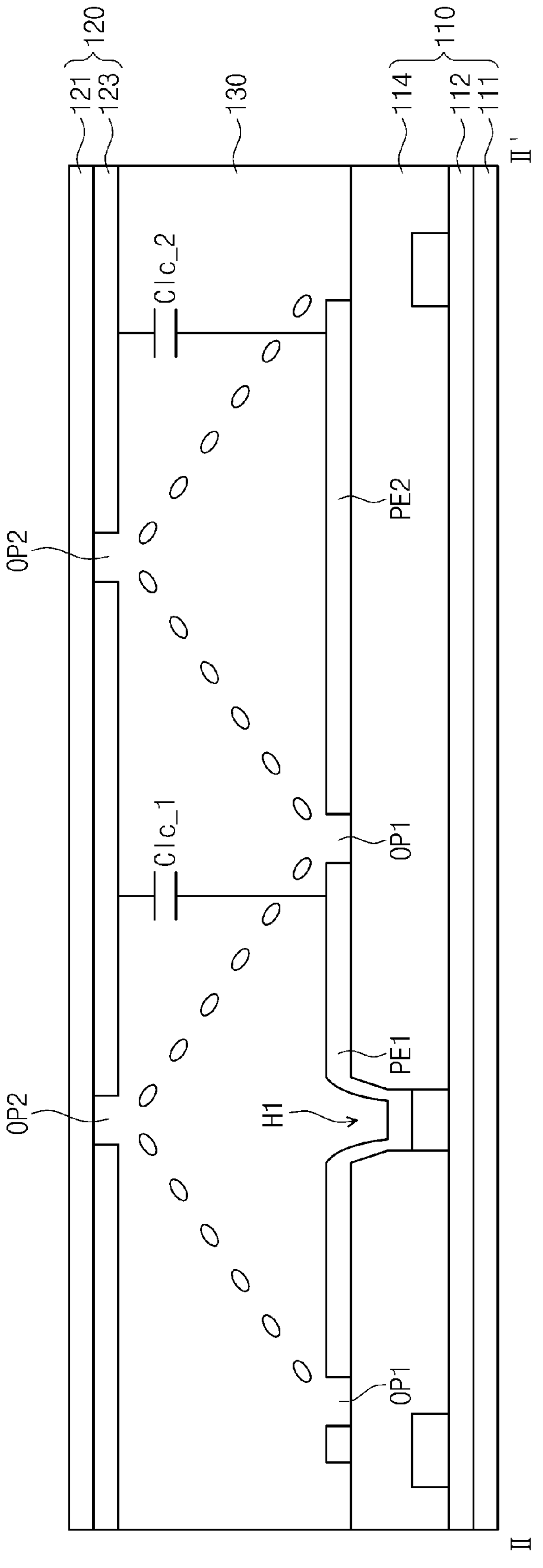
FIG. 6B is a cross-sectional view taken along line II-II' of FIG. 5.

FIG. 5 is a top plan view showing the pixel of FIG. 1, FIG. 6A is a cross-sectional view taken along line I-I' of FIG. 5, and FIG. 6B is a cross-sectional view taken along line II-II' of FIG. 5.

Referring to FIGS. 5 to 6B, an LCD includes an array substrate 110, an opposite substrate 120 facing the array substrate 110, and a liquid crystal layer 130 disposed between the array substrate 110 and the opposite substrate 120. The array substrate 110 includes a first base substrate 111 and a plurality of pixels disposed on the first base substrate 111. Since the pixels have a substantially similar structure and function as each other, for the convenience of explanation, one pixel 101 will be described in detail, and detailed descriptions of other pixels may be omitted.

Referring to FIG. 5, the pixel 101 includes a gate line GL and a data line DL. The gate line GL extends in a first direction D1, the data line DL extends in a second direction D2 that is substantially perpendicular to the first direction D1, and the data line DL is insulated from the gate line GL while crossing the gate line GL. In one exemplary embodiment, the pixel 101 further includes a storage line SL receiving a storage voltage and disposed substantially in parallel with the gate line GL.

In addition, the pixel 101 includes the first and second transistors TR1 and TR2, a first pixel electrode PE1, a first coupling electrode CE1, a second pixel electrode PE2, a resistor R1, and a first cap electrode CA1. In the present exemplary embodiment, the first and second transistors TR1 and TR2 are disposed adjacent to each other.

The first transistor TR1 includes a first gate electrode GE1 branched from the gate line GL, a first source electrode SE1 branched from the data line DL, and a first drain electrode DE1 spaced apart from the first source electrode SE1 with a predetermined interval on the first gate electrode GE1. An active layer 113 is formed between the first gate electrode GE1 and the first source electrode SE1 and the first drain electrode DE1. The second transistor TR2 includes a second gate electrode GE2 branched from the gate line GL, a second source electrode SE2 branched from the data line DL, and a second drain electrode DE2 spaced apart from the second source electrode SE2 with a predetermined interval on the second gate electrode GE2. The active layer 113 is also disposed between the second gate electrode GE2 and the second source electrode SE2 and the second drain electrode DE2.

The second drain electrode DE2 is electrically connected to the resistor R1 and partially covers the resistor R1. The first coupling electrode CE1 is connected to the resistor R1 and spaced apart from the second drain electrode DE2 above the resistor R1. The first cap electrode CA1 is disposed in an area where the storage line SL is extended and the first cap electrode CA1 is disposed substantially opposite to the first coupling electrode CE1. The first coupling electrode CE1 and the first cap electrode CA1 form the first sharing capacitor Cs1.

The resistor R1 includes a material having a conductivity but the material included in the resistor R1 should not be limited to a metal material. In the present exemplary embodiment, the resistor R1 includes an amorphous silicon and is formed on the same layer as the active layer 113. The resistance value of the resistor R1 may be changed in response to exposure to a light provided to the array substrate 110. More particularly, the resistor R1 includes the amorphous silicon having light transmission property as its photoconductivity is enhanced to transmit an electric charge when the amorphous silicon is exposed to the light. As an example, the light is provided from a backlight unit (not shown) included in the LCD.

The first pixel electrode PE1 and the second pixel electrode PE2 are disposed on a protective layer 114 and spaced apart from each other by a first opening OP1. The first pixel electrode PE1 is electrically connected to the first drain electrode DE1 through a first contact hole H1 disposed through the protective layer 114, and the second pixel electrode PE2 is electrically connected to the second drain electrode DE2 through a second contact hole H2.

Meanwhile, the opposite substrate 120 includes a second base substrate 121 facing the first base substrate 111 and a common electrode 123 disposed on the second base substrate 121.

The common electrode 123 is disposed on the opposite substrate 120. The common electrode 123 faces the first and second pixel electrodes PE1 and PE2 while the liquid crystal layer 130 is disposed therebetween. Thus, the common electrode 123 and the first pixel electrode PE1 form the first liquid crystal capacitor Clc_1, and the common electrode 123 and the second pixel electrode PE2 form the second liquid crystal capacitor Clc_2.

The common electrode 123 is provided with a second opening OP2 formed therethrough to divide an area where the first and second pixel electrodes PE1 and PE2 are formed into a plurality of domains. Liquid crystal molecules of the liquid crystal layer 130 in one domain of the plurality of domains may be aligned in different directions from liquid crystal molecules of the liquid crystal layer 130 in another domain of the plurality of domains. In one exemplary embodiment, the second opening OP2 may be desirable to be positioned at a center portion of each of the first and second pixel electrodes PE1 and PE2 in order to improve the number and/or arrangement of the plurality of domains.

Figure 7:
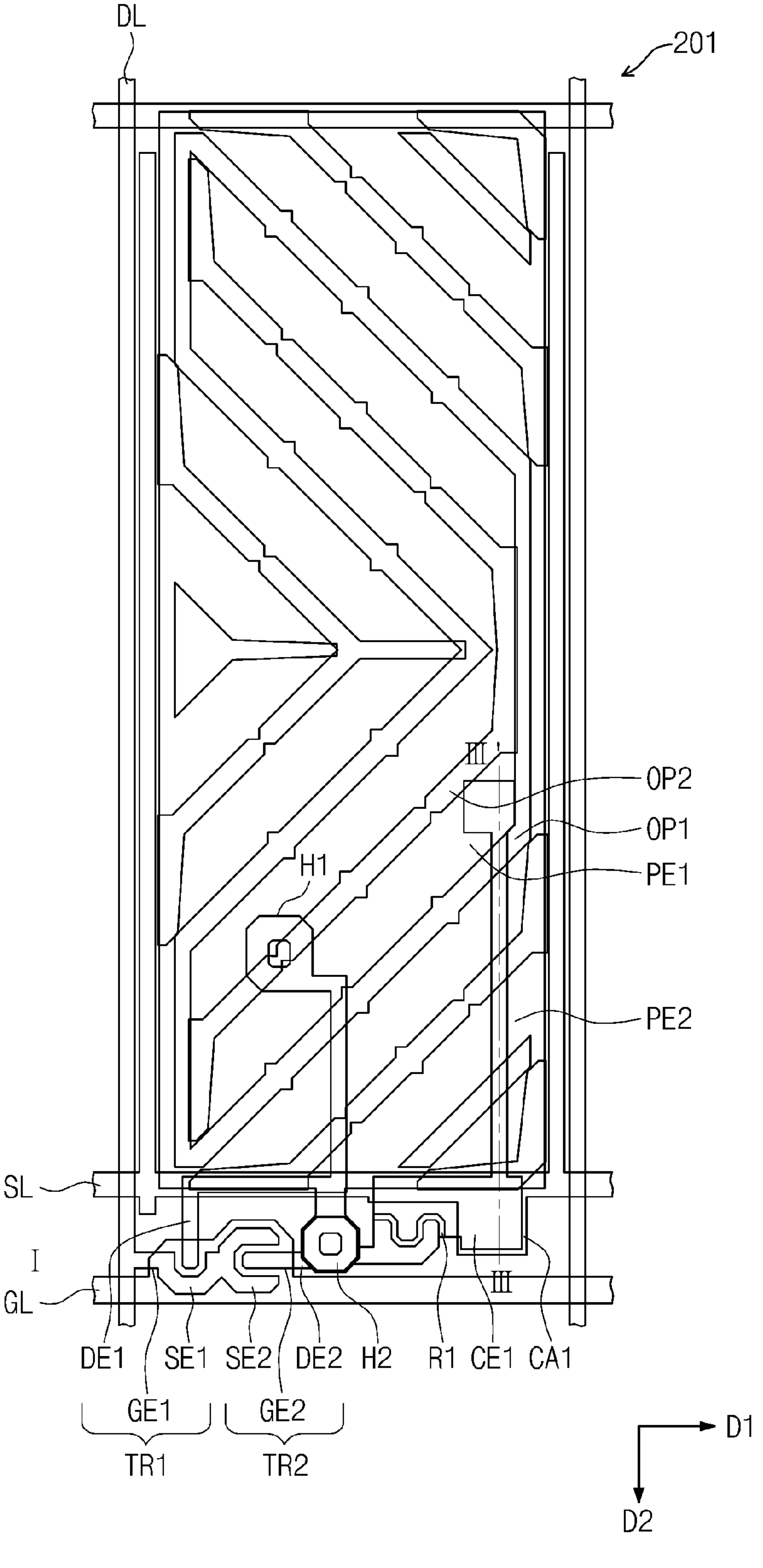
FIG. 7 is a top plan view showing a pixel of FIG. 3.
Figure 8:
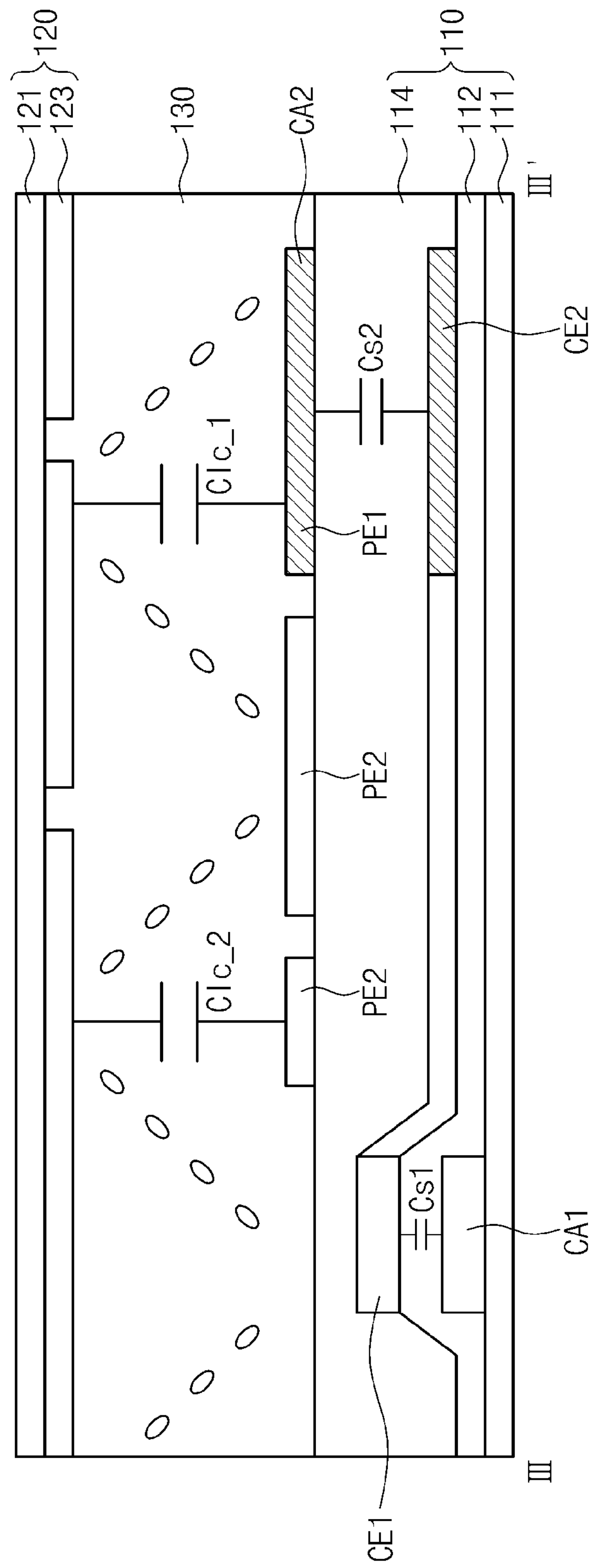
FIG. 8 is a cross-sectional view taken along line III-III' of FIG. 7.

FIG. 7 is a top plan view showing the exemplary embodiment of a pixel of FIG. 3, and FIG. 8 is a cross-sectional view taken along line III-III' of FIG. 7.

In FIGS. 7 and 8, a pixel 201 has a substantially similar structure and function as the pixel 101 shown in FIGS. 5, 6A, and 6B except that the pixel 201 further includes a second coupling electrode CE2 and a second cap electrode CA2. Thus, the same reference numerals denote the same elements in FIGS. 5, 6A, and 6B, and thus the detailed descriptions of the same elements may be omitted.

Referring to FIGS. 7 and 8, the second coupling electrode CE2 is integrally formed with the first coupling electrode CE1. The second cap electrode CA2 is integrally formed with the first pixel electrode PE1 and disposed opposite to the second coupling electrode CE2. Therefore, the second coupling electrode CE2 and the second cap electrode CA2 form the second sharing capacitor Cs2.

FIGS. 9A to 9G are cross-sectional views showing an exemplary embodiment of a method of manufacturing an exemplary embodiment of an LCD according to the present invention. In the present exemplary embodiment, the first and second transistors TR1 and TR2, the resistor R1, the first cap electrode CA1, and the first coupling electrode CE1 may be formed through the following processes.

Figure 9A:
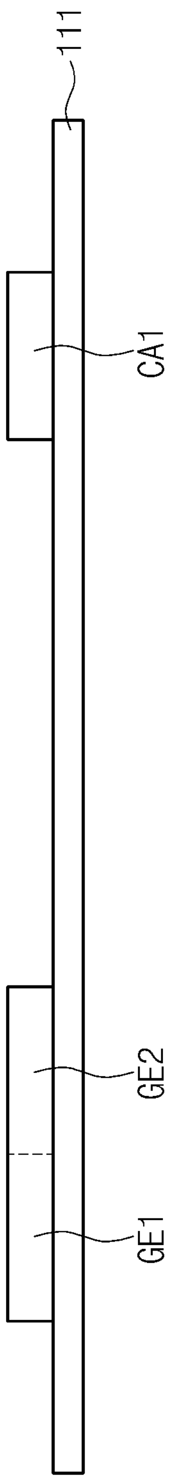
FIGS. 9A to 9G are cross-sectional views showing an exemplary embodiment of a method of manufacturing an exemplary embodiment of an LCD according to the present invention.

Referring to FIG. 9A, a gate metal layer is formed on the first base substrate 111, and the gate metal layer is patterned to form the first gate electrode GE1, the second gate electrode GE2, and the first cap electrode CA1. In the exemplary embodiment, the first and second gate electrodes GE1 and GE2 are integrally formed with each other, although alternative exemplary embodiments include alternative configurations.

Figure 9B:
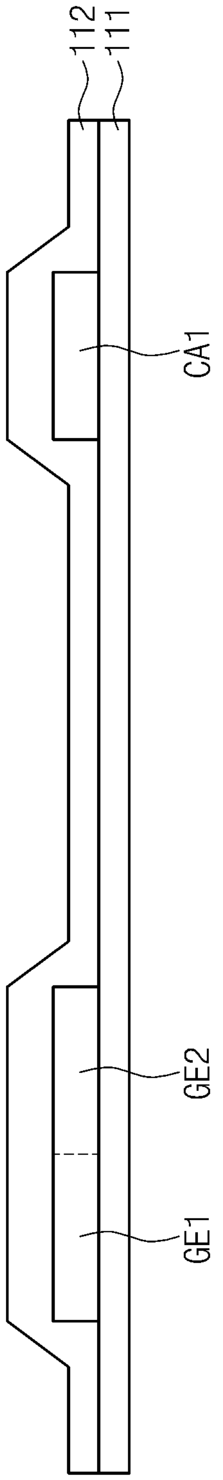

Referring to FIG. 9B, a gate insulating layer 112 is deposited on the first base substrate 111 to cover the first and second gate electrodes GE1 and GE2 and the first cap electrode CA1.

Figure 9C:
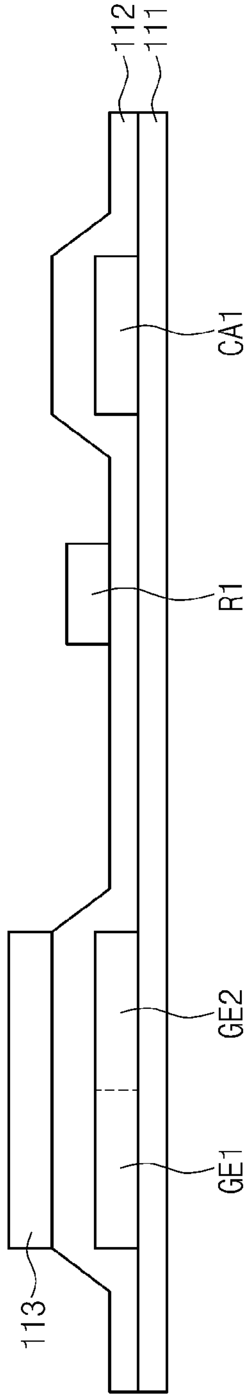

Referring to FIG. 9C, the active layer 113 is formed on the gate insulating layer 112 corresponding to an area where the first and second gate electrodes GE1 and GE2 are formed. The resistor R1 is formed on the gate insulating layer 112, similar to the active layer 113. In one exemplary embodiment, the resistor R1 may be substantially simultaneously formed with the active layer 113.

Figure 9D:
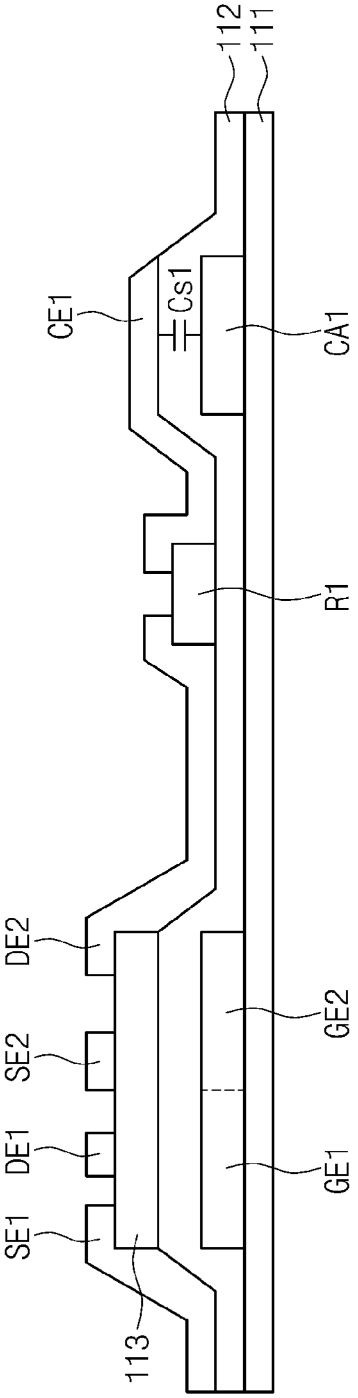

Referring to FIG. 9D, a data metal layer is formed on the gate insulating layer 112 on which the active layer 113 and the resistor R1 are formed. Then, the data metal layer is patterned to form the first and second source electrodes SE1 and SE2 and the first and second drain electrodes DE1 and DE2 that are spaced apart from each other on the active layer 113.

A portion of the second drain electrode DE2 is extended to be formed on the resistor R1 during the manufacturing process of the source and drain electrodes SE1, SE2, DE1, and DE2, and the first coupling electrode CE1 is formed while being spaced apart from the second drain electrode DE2. The first coupling electrode CE1 is extended to be formed in an area facing the first cap electrode CA1. Thus, the first and second transistors TR1 and TR2, the resistor R1, the first cap electrode CA1, and the first coupling electrode CE1 are formed on the first base substrate 111. In one exemplary embodiment, as shown in FIGS. 7 and 8, the second coupling electrode CE2 may be integrally formed with the first coupling electrode CE1. The first sharing capacitor Cs1 is defined by the first cap electrode CA1 and the first coupling electrode CE1.

Figure 9E:
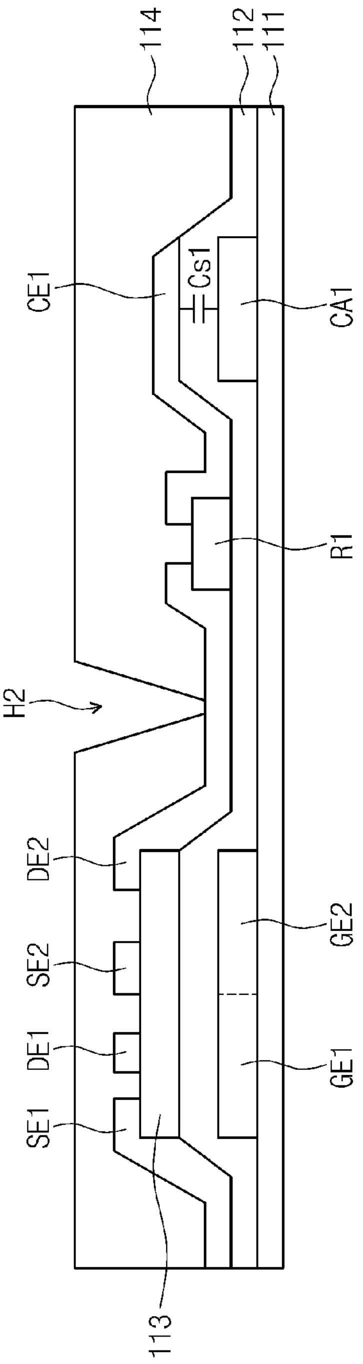

Referring to FIGS. 6A, 6B, and 9E, the protective layer 114 including an inorganic insulating layer such as a silicon nitride layer (SiNx), for example, is formed on the first base substrate 111 to cover the first and second transistor TR1 and TR2 and the first coupling electrode CE1. The first and second contact holes H1 and H2 are formed through the protective layer 114 to connect the first and second pixel electrodes PE1 and PE2 and the first and second drain electrodes DE1 and DE2, respectively. The first contact hole H1 is formed above the first drain electrode DE1, and the second contact hole H2 is formed above the second drain electrode DE2.

Figure 9F:
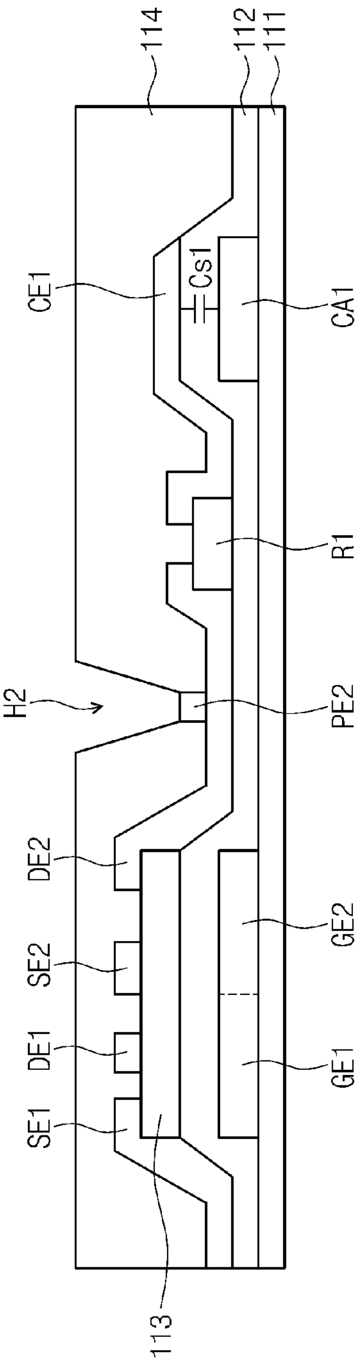

Referring to FIGS. 6A, 6B, and 9F, a transparent conductive layer including an indium tin oxide (ITO) or an indium zinc oxide (IZO), or other materials with similar characteristics is formed on the protective layer 114. Then, the transparent conductive layer is patterned to form the first and second pixel electrodes PE1 and PE2 that are insulated from each other. The first opening OP1 is provided between the first pixel electrode PE1 and the second pixel electrode PE2, so that the first and second pixel electrodes PE1 and PE2 may be spaced apart from each other.

The first pixel electrode PE1 is electrically connected to the first drain electrode DE1 through the first contact hole H1, and the second pixel electrode PE2 is electrically connected to the second drain electrode DE2 through the second contact hole H2. As shown in FIGS. 7 and 8, in one exemplary embodiment, the second cap electrode CA2 may be integrally formed with the first pixel electrode PE1.

Figure 9G:
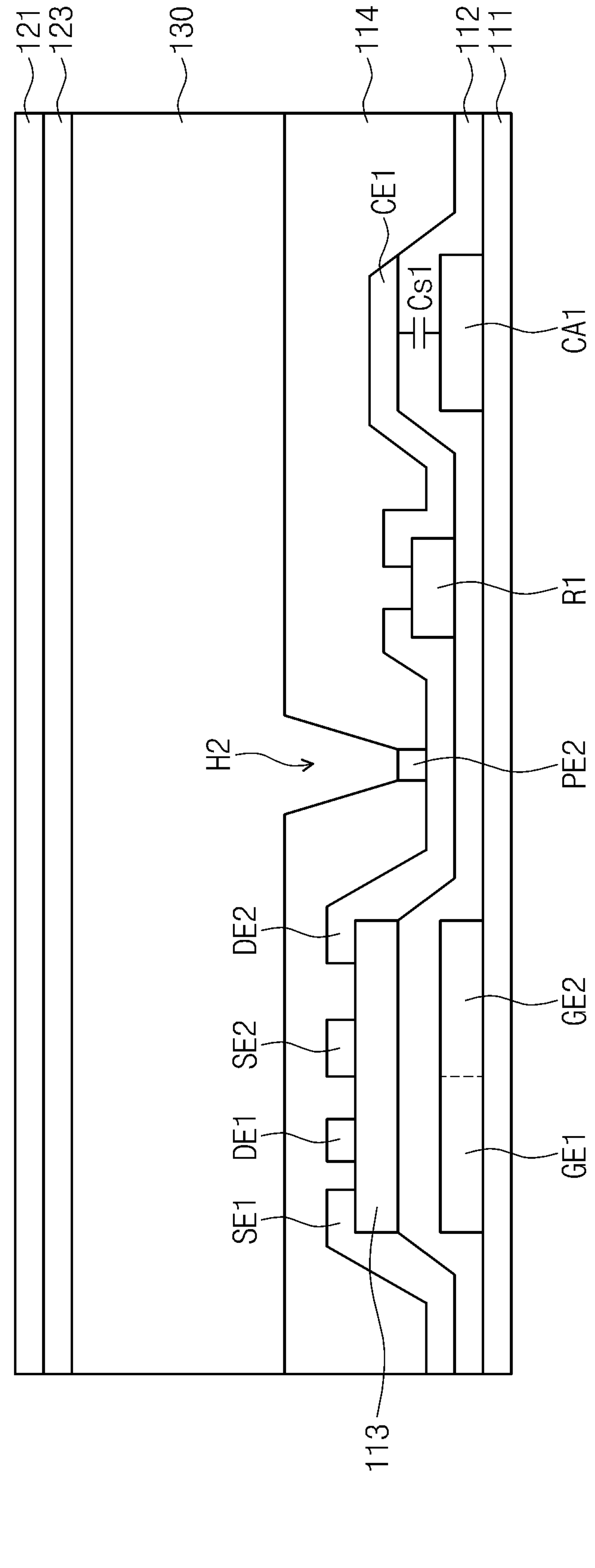

Referring to FIGS. 6A, 6B, and 9G, the common electrode 123 is formed on the second base substrate 121. As shown in FIG. 6B, the second opening OP2 is formed through the common electrode 123 in an area corresponding to the first and second pixel electrodes PE1 and PE2. In one exemplary embodiment, the second opening OP2 may be positioned at the center portion of each of the first and second pixel electrodes PE1 and PE2 as discussed above.

The liquid crystal layer 130 is disposed between the array substrate 110 and the opposite substrate 120. In one exemplary embodiment, the liquid crystal layer 130 may include vertical alignment liquid crystal molecules.

According to above descriptions, a difference in voltages applied to the two sub-pixels is generated using the resistor and the capacitor in the pixel without using an additional switching device. Thus, a parasitic capacitance may be reduced and an aperture ratio may be substantially improved when compared to an alternative configuration using the additional switching device. Also, in one exemplary embodiment, the resistor may include amorphous silicon on the same layer as the active layer 113. Therefore, additional processes are not necessary.

Although the exemplary embodiments of the present invention have been described, it is understood that the present invention should not be limited to these exemplary embodiments but various changes and modifications can be made by one having ordinary skill in the art within the spirit and scope of the present invention as hereinafter claimed.

What is claimed is:

1. A liquid crystal display comprising a plurality of pixels, each pixel of the plurality of pixels comprising:

a gate line configured to receive a gate signal;

a data line configured to receive a data voltage;

a first sub-pixel comprising:

a first transistor connected to the gate line and the data line, wherein the first transistor outputs the data voltage in response to the gate signal; and a first liquid crystal capacitor connected to the first transistor, wherein the first liquid crystal capacitor receives the data voltage output from the first transistor;

a second sub-pixel comprising:

a second transistor connected to the gate line and the data line, wherein the second transistor outputs the data voltage in response to the gate signal; and a second liquid crystal capacitor directly connected to the second transistor, wherein the second liquid crystal capacitor receives the data voltage output from the second transistor;

a resistor connected to the second transistor, wherein the resistor receives the data voltage output from the second transistor; and a first sharing capacitor connected to the resistor, wherein a first electrode of the first sharing capacitor receives the data voltage through the resistor and a second electrode of the first sharing capacitor receives a storage voltage, wherein the resistor is directly connected between the second liquid crystal capacitor and the first sharing capacitor, wherein the first transistor and the second transistor are connected to a same data line.

2. The liquid crystal display of claim 1, wherein the first transistor and the second transistor are connected to a same gate line, the first liquid crystal capacitor is charged with a first pixel voltage during a high period of the gate signal, the second liquid crystal capacitor is charged with a second pixel voltage which has a substantially similar voltage level as the first pixel voltage, the first sharing capacitor shares an electric charge with the second liquid crystal capacitor after the high period of the gate signal to lower the second pixel voltage charged in the second liquid crystal capacitor.

3. The liquid crystal display of claim 2, wherein the resistor has a resistance value satisfying a following equation:

$$1H/(ClcB+Cs)<R<1F/(ClcB+Cs)$$

where 1H represents the high period of the gate signal, 1F represents a time period required to display one frame, ClcB represents a charge capacitance of the second liquid crystal capacitor, Cs represents a charge capacitance of the first sharing capacitor, and R represents a resistance value of the resistor.

4. The liquid crystal display of claim 2, further comprising a second sharing capacitor connected between the first sharing capacitor and the first liquid crystal capacitor, wherein the first pixel voltage charged in the first liquid crystal capacitor increases due to a voltage coupling of the second sharing capacitor after the high period of the gate signal.

5. A liquid crystal display comprising:

an array substrate which includes a first base substrate and a plurality of pixels disposed on the first base substrate;

an opposite substrate which includes a second base substrate disposed substantially opposite to the first base substrate and a common electrode disposed on the second base substrate; and a liquid crystal layer disposed between the array substrate and the opposite substrate, wherein each pixel of the plurality of pixels comprises:

a gate line configured to receive a gate signal;

a data line configured to receive a data voltage;

a first transistor and a second transistor each connected to the gate line and the data line to output the data voltage in response to the gate signal;

a first pixel electrode connected to the first transistor, wherein the first pixel electrode receives the data voltage output from the first transistor;

a second pixel electrode directly connected to the second transistor, wherein the second pixel electrode receives the data voltage output from the second transistor, the second pixel electrode being spaced apart from the first pixel electrode;

a resistor connected to the second transistor, wherein the resistor receives the data voltage output from the second transistor; and a first sharing capacitor which includes a first coupling electrode connected to the resistor, wherein the first sharing capacitor receives the data voltage through the resistor and a first cap electrode opposite to the first coupling electrode, wherein the first cap electrode receives a storage voltage, wherein the resistor is directly connected between the second liquid crystal capacitor and the first sharing capacitor, wherein the first transistor and the second transistor are connected to a same data line.

6. The liquid crystal display of claim 5, wherein the resistor comprises an amorphous silicon and the resistance of the resistor varies according to its exposure to light provided to the array substrate.

7. The liquid crystal display of claim 5, wherein the array substrate further comprises a second sharing capacitor comprising:

a second coupling electrode electrically connected to the first coupling electrode; and a second cap electrode disposed substantially opposite to the second coupling electrode and electrically connected to the first pixel electrode.

8. The liquid crystal display of claim 7, wherein the second cap electrode is integrally formed with the first pixel electrode, the second coupling electrode is integrally formed with the first coupling electrode, and the second sharing capacitor is formed by partially overlapping the first pixel electrode and the first coupling electrode.

9. The liquid crystal display of claim 5, wherein the array substrate further comprises a storage line arranged substantially in parallel with the gate line to receive the storage voltage, and the first cap electrode extends from the storage line.

10. The liquid crystal display of claim 5, wherein the common electrode is provided with an opening arranged in an area where the first and second pixel electrodes are disposed.

11. The liquid crystal display of claim 5, wherein the liquid crystal layer comprises vertical alignment liquid crystal molecules.

12. A method of driving a liquid crystal display comprising a plurality of pixels, wherein each pixel of the plurality of pixels includes a first sub-pixel which includes a first transistor connected to a gate line and a data line and a first liquid crystal capacitor connected to the first transistor and a second sub-pixel which includes a second transistor connected to the gate line and the data line and a second liquid crystal capacitor directly connected to the second transistor, wherein the first transistor and the second transistor are connected to a same data line, the method comprising:

outputting a data voltage provided from the data line through the first transistor and the second transistor during a high period of a gate signal provided through the gate line;

receiving the data voltage to charge the first liquid crystal capacitor with a first pixel voltage and to charge the second liquid crystal capacitor with a second pixel voltage which has a substantially similar voltage level as the first pixel voltage; and sharing an electric charge using a first sharing capacitor, and the second liquid crystal capacitor after the high period of the gate signal, wherein a resistor directly connected between the second liquid crystal capacitor and the first sharing capacitor and connected to the second transistor in parallel with the second liquid crystal capacitor to allow the second pixel voltage charged in the second liquid crystal capacitor to be lower than the first pixel voltage.

13. The method of claim 12, wherein the resistor has a resistance value satisfying a following equation:

$$1H/(ClcB+Cs)<R<1F/(ClcB+Cs)$$

where 1H represents the high period of the gate signal, 1F represents a time period required to display one frame, ClcB represents a charge capacitance of the second liquid crystal capacitor, Cs represents a charge capacitance of the first sharing capacitor, and R represents a resistance value of the resistor.

14. The method of claim 12, wherein a voltage coupling occurs after the high period of the gate signal, the voltage coupling occurs due to a second sharing capacitor connected between the first sharing capacitor and the first liquid crystal capacitor, and the first pixel voltage charged in the first liquid crystal capacitor increases due to the voltage coupling.

15. A method of manufacturing a liquid crystal display, the method comprising:

providing an array substrate which includes a first base substrate on which a plurality of pixel areas is disposed;

providing an opposite substrate which includes a second base substrate on which a common electrode is disposed; and disposing a liquid crystal layer between the array substrate and the opposite substrate, wherein the providing of the array substrate comprises:

providing a first transistor, a second transistor, and a first cap electrode in each pixel area of the plurality of pixel areas;

providing a resistor connected to the second transistor;

providing a first coupling electrode connected to the second transistor through the resistor and opposite to the first cap electrode; and providing a first pixel electrode connected to the first transistor and a second pixel electrode which is directly connected to the second transistor, wherein the resistor is directly connected between the second pixel electrode and the first coupling electrode.

16. The method of claim 15, wherein the providing of the first transistor and the second transistor and the first cap electrode comprises:

providing a first gate electrode, a second gate electrode, and the first cap electrode;

covering the first gate electrode, the second gate electrode, and the first cap electrode with an insulating layer;

disposing a first active layer and a second active layer on the insulating layer to respectively correspond to the first gate electrode and the second gate electrode on the insulating layer; and disposing a first source electrode and a first drain electrode spaced apart from the first source electrode on the first active layer and a second source electrode and a second drain electrode spaced apart from the second source electrode on the second active layer.

17. The method of claim 16, wherein the resistor is substantially simultaneously formed with the first active layer and the second active layer on the insulating layer and includes a substantially similar material as the first active layer and the second active layer.

18. The method of claim 15, the method further comprising:

connecting a second coupling electrode connected to the first coupling electrode; and disposing a second cap electrode substantially opposite to the second coupling electrode; and electrically connecting the second cap electrode to the first pixel electrode.

19. The method of claim 17, wherein the second coupling electrode is integrally formed with the first coupling electrode, and the second cap electrode is integrally formed with the first pixel electrode.

20. The method of claim 15, wherein the providing of the opposite substrate further comprises forming an opening through the common electrode in areas which corresponds to the first pixel electrode and the second pixel electrode, respectively.

21. The method of claim 15, wherein the liquid crystal layer comprises vertical alignment liquid crystal molecules.

* * * * *